United States Patent

[11] 3,562,496

| [72] | Inventor | Charles R. Fisher<br>5913 Renwood Drive, Parma, Ohio 44129 |
|---|---|---|
| [21] | Appl. No. | 695,624 |
| [22] | Filed | Jan. 4, 1968 |
| [45] | Patented | Feb. 9, 1971 |

[54] DATA-SENSING DEVICE
24 Claims, 4 Drawing Figs.

| [52] | U.S. Cl. | 235/61.11,<br>346/74; 178/17 |
|---|---|---|
| [51] | Int. Cl. | G06k 7/06 |
| [50] | Field of Search | 235/61.111,<br>61.112; 346/74S, SB; 178/17D |

[56] References Cited
UNITED STATES PATENTS

| 3,373,270 | 3/1968 | Fenner | 235/61.111 |
|---|---|---|---|

*Primary Examiner*—Thomas A. Robinson
*Attorney*—Teare, Teare and Sammon

ABSTRACT: A data-sensing device for sensing indicia on an indicia carrying member, such as an individual card or continuous tape. The device comprises at least one pair of oppositely disposed terminals which are electrically connected to a power source. A signal control arrangement is provided for selectively transmitting electrical energy to the terminals from the power source causing a spark to pass through an aperture in the indicia member or through the material of the indicia member and to an indicating arrangement provided to indicate the presence of the spark.

INVENTOR.
CHARLES R. FISHER
BY
Leahe, Leahe, & Sammon
ATTORNEYS

DATA-SENSING DEVICE

BACKGROUND OF THE INVENTION

The present invention relates to data-sensing devices for use with business machines, data processing machines and/or machines having automated control systems, and more particularly to a device for detecting data in the form of an area of relatively low dielectric strength, such as an aperture disposed on a data card or tape.

Heretofore, several methods have been employed to sense data disposed on a record card or the like. One of such methods has consisted of a perforated strip which allowed the passage of a beam of light to pass through the strip and to impinge upon a light-activated device. Other devices have been utilized which employed the use of sensing brushes and/or sensing marks or index points, but such methods have been found to require considerable maintenance due to their inherent mechanical characteristics and thus, are not as reliable over prolonged periods of operation. In addition, some of these devices require cards having abrasive surfaces for cleaning of the sensing brushes, and thus, must be operated in a humidity controlled atmosphere. Still other devices have been employed which utilized tuned circuits for varying the capacitance of the circuit and hence, regulate the conductivity of the control circuit thereby producing a control signal, but these latter devices still have not proven to be entirely satisfactory.

SUMMARY OF THE INVENTION

The data-sensing device of the present invention is adapted for sensing indicia carried by an indicia member having energy passage means disposed therein. A power means is provided which is electrically associated with the indicia-sensing means. A signal control means is electrically associated with the power means and the indicia-sensing means and is adapted for causing electrical energy to be transmitted from the power means to the indicia-sensing means. The indicia-sensing means comprises at least one pair of oppositely disposed terminal members adapted for transfer of electrical energy therebetween when aligned with the energy passage means upon energization of the power means. The signal control means includes a switching means which is electrically associated with the power means for selectively controlling the transmission of electrical energy to the signal control means. An indicating means is provided which is electrically associated with the indicia-sensing means and is adapted to indicate the transmission of electrical energy to the indicia-sensing means and through the energy passage means.

By the foregoing arrangement, there is provided a fast-acting data-sensing device which is capable of extremely high reliability over prolonged periods of operation, and which is reasonably free from conventional maintenance requirements. Furthermore, there is provided an arrangement which is not highly sensitive to small variations in thickness or surface conditions of the data or record cards, but which can perform satisfactorily with data cards having an extremely wide range of thickness with smooth or irregular surface conditions, and made of various types of nonconductive materials, and which does not necessarily require operation in a humidity controlled atmosphere.

DESCRIPTION OF THE PREFERRED EMBODIMENTS

Figure 1:
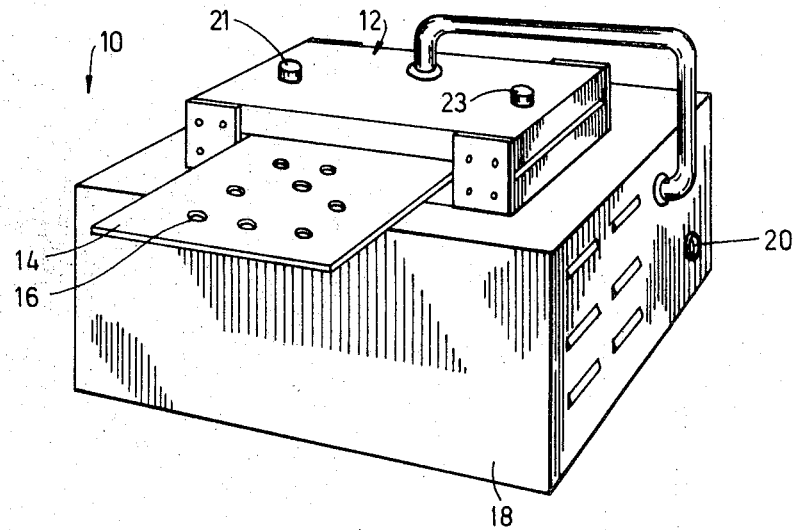
FIG. 1 is a generally perspective view of the data-sensing device of the present invention.

The data-sensing device of the present invention is illustrated, generally at 10, in FIG. 1. The device comprises an indicia-sensing means 12 which is adapted to receive an indicia member, such as at 14, having energy passage means 16 therein which in the forms shown comprises an area or areas of relatively low dielectric strength. As shown, the indicia-sensing means 12 may be mounted on a control console 18 which houses a typical electrical control circuit, schematically illustrated in FIG. 2, which may be employed to carry out the purpose of the present invention. The control console 18 may be provided with a power inlet, as at 20, for electrically connecting the device to a suitable source P of electrical power. The device is arranged such that upon the introduction of an indicia means 14 into the indicia-sensing means 12 a signal means 22 may be energized which causes energy in the form of an electrical current to be transmitted from the signal means 22 to the indicia-sensing means 12. The indicia-sensing means 12 may be constructed and arranged such that the electrical energy produced will pass through the energy passage means 16 in the indicia means 14 and transmitted to a suitable indicating means, such as at 24, FIG. 2.

The indicia-sensing means 12 preferably includes a pair of spaced-apart support members in the form of generally flat horizontally disposed plates 26 and 27. The plates 26 and 27 may include generally planar confronting surfaces 28 and 29 (FIG. 3) which extend generally parallel to one another and are adapted to receive a generally flat indicia means, such as a card or tape 14, therebetween. The plates 26 and 27 may be mounted in any suitable manner, such as by bolts 21 and 23 (FIGS. 1 and 3) or the like, on a suitable frame structure such as the control console 18. The plates 26 and 27 may include a suitable spacing means, as at 25, to maintain the plates in a predetermined spaced relation with respect to one another or may be provided with a suitable adjustment means (not shown) for adjusting the width of the space 35 between the confronting surfaces 28 and 29, as desired. As the space 35 between the confronting surfaces 28 and 29 may be varied depending upon the thickness of the indicia means utilized, the potential difference required between the surfaces 28 and 29 to cause the transfer of electrical energy or spark across the space 35 between the respective opposite terminal portions, such as 33a and 34a, may be varied accordingly. That is, voltage substantially less or greater may be provided depending upon whether the spacing is decreased or increased, respectively, and still achieve effective energy transfer. The plates 26 and 27 may be made of any suitable material, but preferably comprise any suitable electrical insulating material, such as Bakelite, which is a trade name for a product manufactured by the Union Carbide Corporation, to provide insulation for the terminal means, as will be discussed hereinafter.

Figure 2:
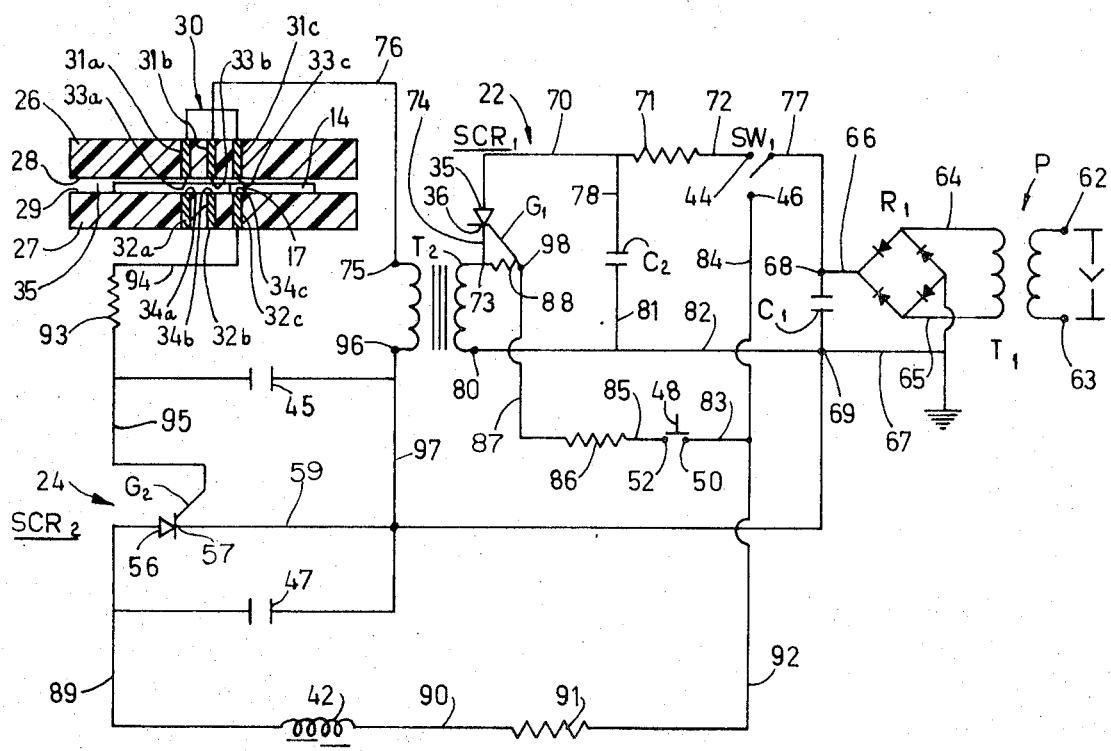
FIG. 2 is a diagrammatic illustration of a typical electrical circuit which can be utilized in carrying out the present invention.

The indicia-sensing means 12 may be provided with terminal means 30 which comprises at least one pair of oppositely disposed conductor elements, such as 31c and 32c, carried by the plates 26 and 27, respectively. As illustrated in FIG. 2, however, a plurality of oppositely disposed conductor elements 31a, 31b, 31c and 32a, 32b, 32c may be carried by the plates 26 and 27, as desired. Preferably, the conductor elements include exposed terminal portions, as at 33a, 33b, 33c and 34a, 34b, 34c, which are preferably disposed flush with the surfaces 28 and 29, respectively. Preferably, the conductor elements 31a, 31b, 31c of the plate 26 have their exposed terminal portions 33a, 33b and 33c disposed in aligned relation with respect to the exposed terminal portions 34a, 34b, 34c of the conductor elements 32a, 32b and 32c respectively. Preferably, these terminal portions are spaced apart a distance such that upon energization of the indicia-sensing means 12 electrical energy in the form of a "spark" will be produced in the space or gap 35 between any and/or all of the oppositely disposed terminal portions.

Preferably, the spacing between the respective conductor elements should be such that a transfer of energy or sparking will occur between opposed pair of conductors, such as 31a and 32a, but will not occur between adjacent opposed pairs, that is between the upper conductor 31a in the plate 26 and the lower conductor 32b in the plate 27. As electrical energy will arc across the path of least resistance, the foregoing may be arranged by maintaining a spacing between adjacent pairs of conductors which is greater than the width of the space 35 so as to provide a distance between opposed terminals, such as 33a and 34a, less than that between the terminal portions of the adjacent opposed conductor elements, such as 33a and 34b. The likelihood of cross-arcing is further diminished when the indicia means is disposed between the plates 26 and 27 increasing the length of the path between adjacent opposed conductors, such as 31a and 32b, which will be discussed in more detail hereinafter.

The conductor elements may be of any configuration, but are preferably of a uniform, circular cross section. As the potential difference required to cause a "spark" between the respective opposed terminal surfaces increases as the cross-sectional area of the conductor elements increases, it is preferable that the cross-sectional area of the conductor elements be as small as possible. In addition, it is preferred that the distance A between adjacent conductor elements, such as 31a and 31b, be greater than the diameter D of the respective conductor elements. This arrangement provides a wider range of voltage within which a particular voltage may be selected which will cause sparking between opposed terminal portions, such as 33a and 34a, but which will not cause sparking between adjacent opposed terminal surfaces, such as 33b and 34a.

The selective "sparking" between the respective terminal portions is passed through an indicia means 14, such as a tape or card. Preferably, the indicia means 14 is substantially flat and of substantially uniform thickness to obtain optimum results, but variations in thickness and irregular surface conditions may exist and still achieve satisfactory results. Preferably, the indicia means 14 is made of a suitable dielectric or nonconductive material, such as paper, plastic or the like, to provide an insulating barrier between the respective plates 26 and 27. When relatively low dielectric strength material, such as paper is utilized, it may be provided with a suitable coating, such as plastic or the like, to provide increased dielectric strength adjacent those areas where such is desired.

More specifically, the energy passage means 16 in the indicia means 14 comprises, in one form, an area or portion of the indicia means which has a relatively lower dielectric strength as compared to the main body of the indicia means. Preferably, such energy passage means includes one or more apertures 17, such as holes punched in the indicia means. Thus, the air in the apertures will provide an area having the lowest dielectric strength and hence, the least resistance to the passage of a spark through the indicia means.

The aperture or apertures 17 may be of any suitable configuration with the spacing therebetween corresponding to the spacing of the terminal portions, such as 33a, 33b and 33c, to provide a path for the passage of electrical energy from one terminal portion, such as 33c, to an oppositely disposed terminal, such as 34c. The remainder of the card 14 may act as an insulating barrier between others of the terminal portions, such as 33b and 34b, to prevent the flow of electrical energy therebetween.

Each indicia means 14 may be provided with any number of apertures, and the indicia-sensing means 12 with any number of terminals depending upon the particular application. For example, in the case of static reading, that is where the card 14 remains stationary during the sensing period, it may be desirable to provide each plate 26 and 27 with the same number of conductor elements as there are apertures in the indicia member. Whereas, in the case of dynamic reading, as when the indicia means 14 is in the form of a continuous tape member (not shown) which may be fed continuously between the plates 26 and 27, only a single row of laterally spaced conductor elements, such as 33a, 33b and 33c, may be provided to sense a single row of apertures, such as 17. In this case, the apertures may be disposed transversely of and spaced widthwise of the tape so that as the tape is indexed row by row through the indicia-sensing means 12, each individual row may be aligned with the terminal means 30. Although the aperture, such as 17, may be of any size to permit the transfer of electrical energy therethrough, it is preferred that the transverse width or diameter thereof be only slightly greater than the transverse diameter or width of the conductor element, thereby maximizing the passageway for electrical energy between adjacent opposed terminal portions, such as 33b and 34a.

A suitable control console 18 may be provided to house the control circuit for carrying out the present invention. There is illustrated schematically in FIG. 2 one circuit which may be employed. As shown, power may be supplied to the control circuit from a suitable source of AC power, such as at V. The power supply may be connected, as at 62 and 63, to the primary terminals of a suitable transformer T1 to increase or decrease the input voltage V depending upon the design parameters of the control circuit. Preferably, the output terminals of the transformer T1 are connected to a suitable rectifying means R1 which may be Type No. MDA 920-7, manufactured by the Motorola Corp. by means of conductors 64 and 65 to convert the AC power input to DC power for energizing the signal control means 22. The rectifier R1 is connected across a filter capacitor C1 by means of conductors 66 and 67, as at terminal 68 and 69. The capacitor C1 may be provided to smooth out the pulsating DC current and provide more effective electrical characteristics in the control circuit. Any suitable capacitor may be used, but preferably one having a rating of 550 mfd. may be utilized, such as type CG551T350CH1 manufactured by the Mallory Co.

The signal control means 22 may comprise any suitable arrangement for transmitting electrical energy to the indicia-sensing means 12, but preferably comprises a switching device, such as a silicon control rectifier, which will be designated hereinafter as SCR1, and may be of the Type No. MCR2604-4 or 2N4172 as manufactured by the Motorola Corporation.

The control rectifier SCR1 may have an anode 35 connected by means of conductor 70 to the charge limiting resistor 71, preferably having a rating of 1K ohms in the embodiment shown, which may be connected by conductor 72 to the power source P by means of a suitable switching device, such as the switch SW1, at contact 44. The output terminal 36 or cathode of the SCR1 may be electrically connected to the terminal means 30 of the indicia-sensing means 12 or to the input terminal 73 of a suitable step-up transformer T2 by conductor 74. The secondary terminal 75 of the transformer T2 may be connected by conductor 76 to the terminal means 30 to increase the output voltage of the SCR1 depending upon the particular voltage required at the gap 35 to cause electrical energy in the form of a spark to pass between the respective opposed terminal portions, such as 33c and 34c. Any suitable transformer may be provided, but preferably one having a low impedance core, such as Model P-6134, manufactured by the Chicago Standard Transformer Corp., which will provide an extremely fast rate of change of voltage. The switching device SW1 may be of any suitable mechanical or electrical switching device, but is preferably shown for purposes of illustration having two contact points 44 and 46 adapted to electrically connect the signal control means 22 to the power source by the conductor 77 which may be connected to the terminal 68 of the capacitor C1.

The signal control means 22 may also be provided with a charging capacitor C2 which has one plate electrically connected to the anode 35 by the conductors 78 and 70 and to contact 44 of the switch SW1 by the conductor 78, resistor 71, and conductor 72. The opposite plate of the capacitor C2 may be connected to the terminal 80 of the transformer T2 by the conductors 81 and 82. The capacitor C2 may be any suitable capacitor, such as type CP70B1DF106 X manufactured by The Sprague Electric Company. The capacitor C2 may be connected in parallel with the SCR1 so that upon closing of the switch SW1, as at contact 44, the capacitor will be charged and whereby upon movement of the switch SW1 from contact 44 to contact 46, the charge on the capacitor will maintain the SCR1 in a nonconductive, forward biased condition.

To selectively introduce sufficient gate current for triggering the SCR1 when the indicia means is properly aligned in the indicia-sensing means 12, the signal control means 22 may be provided with another switching device 48 to electrically connect the gate G1 of the SCR1 to the power source. The switching device 48 may comprise any suitable mechanical or electrical switching device, but is preferably shown for purposes of illustration as a manually operated push button. The device has one contact 50 electrically connected by conductors 83 and 84 to the contact 46 of switch SW1 and another contact 52 connected directly to the gate G1 of the SCR1 by the conductor 85, 10K resistor 86, and conductor 87. To reduce the sensitivity of the SCR1, a suitable resistor, such as the 1K resistor 88, may be connected between the terminal 73 of the transformer T2 and the gate G1 of the SCR1, as at 98, thereby preventing premature conduction of the SCR1 as a result of transients in the control circuit. By the foregoing arrangement, when the push button 48 is depressed, gate current will be introduced at the gate G1 to cause conduction by the SCR1 and, therefore, discharge of the capacitor C2 and transmission of electrical energy to the indicia-receiving means 12.

To provide an indication of a transfer of electrical energy or spark in the space 35, an indicating means, such as at 24, may be provided for each conductor element 32a, 32b and 32c to indicate the presence of an aperture in the indicia means 14. Although a plurality of apertures may be indicated simultaneously, only one, such as 17, is provided for purposes of description. The indicating means 24 preferably comprises a switching device, such as a silicon control rectifier, which will be hereinafter designated as SCR2 and may be the type C106B1 as manufactured by the General Electric Co., and an indicating device 42. The indicating device 42 may consist of any suitable device which will indicate the conduction of current through the SCR2, such as a light, electronic switching circuit or the like, but is preferably shown as a relay, and which may be of the mercury wetted contact type, Model No. HG-1002, manufactured by the C.P. Clare Co. Preferably, the cathode of the SCR2, as at 57, may be connected to ground at 69 by conductor 59 while the anode or input terminal 56 of the SCR2 may be electrically connected in series with the relay 42 by means of the conductor 89. The relay may be connected to the contact 46 of the switch SW1 as by the conductor 90, a 10K resistor 91, and conductors 92 and 84, respectively so that upon movement of the switch from the charging position, as at 44, into contact with contact 46, the SCR2 will be in the nonconductive forward biased condition. A suitable isolating resistor 93, preferably having a rating of 1 megohm, may be connected to the conductor element 32c by the conductor 94, and in series with the gate G2 by conductor 95 so that upon sparking in the gap between the terminal portions 33c and 34c, a sufficient injection of gate current will be produced for triggering the SCR2 into a conductive condition. Preferably, the resistor 93 should be placed as close as possible to the conductor elements to reduce parallel loading and insure that a "spark" will occur simultaneously between all of the opposed pairs of conductor elements when such is desired. The resistor 93 also serves to prevent a hot spark thereby reducing overheating and erosion of the respective terminal portions. The filter capacitors 45 and 47, which in the embodiment shown may have a rating of 0.01 and 0.02 mf. respectively, may be provided. The capacitor 45 may be connected in series between the terminal 96 of the transformer T2 and the gate G2 by means of the conductors 97 and 95, respectively, and to the cathode 57 of the SCR2 by the conductors 97 and 59. The capacitor 47 is connected in series between the terminal 96 and the anode 56 of the SCR2 by the conductors 97 and 89, respectively, and to the cathode 57 by the conductors 59 and 97. The capacitor 45 is provided to prevent transients from falsely triggering the SCR1 whereas, the capacitor 47 serves as a bypass filter to prevent false triggering of the SCR2 with the sudden application of anode voltage when the switch SW1 is closed at contact 46.

Figure 4:
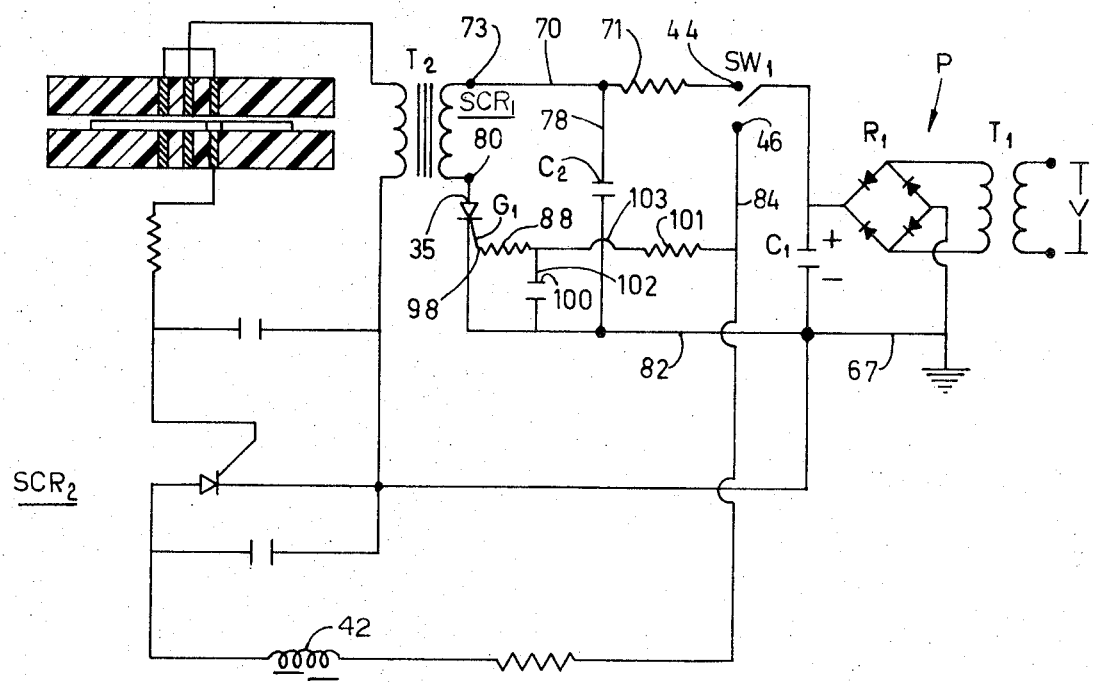
FIG. 4 is a diagrammatic illustration of another embodiment of the control circuit of FIG. 2 which can be utilized in carrying out the present invention.

Referring now to FIG. 4, there is illustrated another embodiment of control circuit shown in FIG. 2 which may be utilized in carrying out the present invention. In the circuit in FIG. 4 the switching device 48 has been eliminated and the gate G1 may be directly connected to the power source P when the switch SW1 is closed and voltage is applied at contact 46. Preferably, the gate G1 is connected to one side of the 1K resistor 88, as at 98, while the other side of the resistor 88 is connected to one side of the capacitor 100, preferably having a rating of 1 microfarad in the embodiment shown, and the 40K resistor 101 by conductor 102 and 103 respectively. The resistor 101 may be connected to the contact 46 of the switch SW1 by conductor 84 while the other side of the capacitor 100 is connected to ground by the conductors 82 and 67. By this arrangement, a slight time delay is achieved which may be desirable when a relay, such as 42, is utilized in the indicating circuit. When a quicker responding device, such as a transistor (not shown) or the like is utilized, the timing circuit, including the resistor 101 and capacitor 100 may be eliminated, as desired. In addition, in the embodiment shown in FIG. 4, the transformer T2 may be placed on the input side of the SCR1 with the anode 35 being connected to one input terminal 80, whereas the other input terminal 73 of the transformer T2 is connected to the capacitor C2 by the conductors 70 and 78, and connected to the limiting resistor 71 by the conductor 70.

As previously indicated, the switching device, such as SW1, although shown as being manually operable, may be an electronic switching device so that virtually instantaneous switching may be achieved. In the invention, a suitable mechanical, electrical or electromechanical control arrangement (not shown) may be provided for automatically indexing and/or registering the indicia means 14 with respect to the indicia-sensing means 12 and which may operate to automatically actuate the switch SW1 and push button 48 in timed response, as desired.

OPERATION

Figure 3:
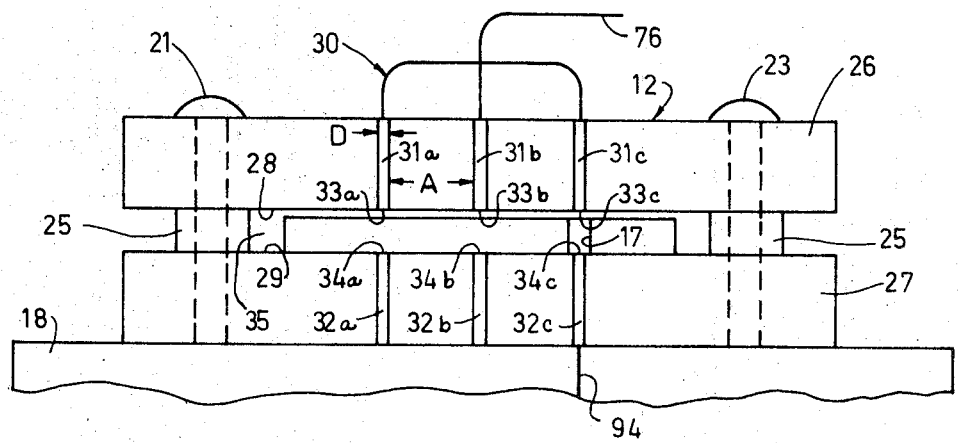
FIG. 3 is an enlarged detailed elevation view of the indicia-sensing means illustrated in FIG. 2.

Referring now to FIG. 3 in a typical operation of the aforementioned data-sensing device, the plates 26 and 27 have their confronting surfaces 28 and 29 spaced from one another such that the oppositely disposed terminal surfaces, such as 33 and 34, may be disposed in a range of approximately 0.001 to 0.025 inches apart depending upon the thickness and type (card or tape) indicia means 14 being used, and with the conductor diameter D of approximately 0.030 inches, and with the distance A between adjacent conductor elements being approximately 0.055 inches. Utilizing the foregoing structural arrangement sparking between the respective pairs of terminal surfaces 33 and 34 may be achieved effectively by impressing a potential difference of approximately 3,000 to 4,000 volts or less between the respective terminal surfaces. This voltage may be accomplished by utilizing an input voltage V of approximately 110 volts AC and by providing transformers T1 of T2 with primary/secondary step-up ratios of 1:1.35 and 6.3:117, respectively.

Referring to FIG. 2, to achieve selective transmission of electrical energy to the indicia-sensing means 12, the AC power input of 110 volts may be impressed across the terminals 62 and 63 of the transformer T1. As transformer T1 has an input/output ratio of 1:1.35, an input, such as 185 volt AC may be impressed across the terminals of the rectifier R1. By closing the switch SW1, as at 44, the DC power output of the rectifier R1 will apply a potential difference across the SCR1 and the plate of the capacitor C2 for forward biasing the SCR1 and charging the capacitor C2. Upon movement of the switch SW1 from the contact 44 to the contact 46, the power output of the rectifier R1 is connected to the contact 50 of the initially open switch 48, as well as, across the SCR2 to forward bias the SCR2. When the switch 48 is closed between the contacts 50 and 52, sufficient voltage is applied to the gate G1 so that the blocking action of the SCR1 is overcome to cause the capacitor C2 to discharge through the SCR1 providing an input to the primary terminals 73 and 80 of the step-up transformer T2. Since the transformer T2 may have an input-output ratio of 6.3:117, the voltage input to the terminal means 30 of the indicia means 12 will be approximately 3500 volts. When the indicia member 14, having a width slightly less than the distance between the confronting surfaces 28 and 29, is disposed in the space 35 between the confronting surfaces 28 and 29, an insulating barrier is provided between the respective terminal surfaces, such as 33a and 34a. When the aperture, such as 17, in the indicia member 14 is registered between the opposed terminal surfaces, such as 33c and 34c, there is provided a passage for the transmission of electrical energy in the form of a "spark" between such terminal surfaces of the plates 26 and 27, respectively. As the conductor element 32c is electrically connected to the gate G2, the energy transmitted in the form of a spark through the space 35 will produce sufficient gate current to overcome the blocking action of the SCR2 to cause the SCR2 to conduct and the relay 42 to be actuated for indicating the presence of the data on the indicia member 14 via the aperture 17 therein.

In FIG. 4 the circuit illustrated operates similarly to the circuit illustrated in FIG. 2, but being exceptionally well adapted for indicating indicia on a continuous tape or the like. In the embodiment shown in FIG. 4, upon closing of the switch SW1, as at 44, the capacitor C2 is charged and the SCR1 is forward biased, as previously described. Upon movement of the switch from contact 44 to contact 46, the output of the rectifier R1 is directly connected to the gate G1 whereby sufficient potential is applied to overcome the blocking action of the SCR1 causing a potential difference across the plates 26 and 27. By this arrangement, sufficient gate current is supplied to the gate G1 to cause the SCR1 to conduct substantially simultaneously upon closing of the switch SW1 at contact 46 to facilitate extremely rapid and automatic sparking and sensing operations of the device. In this circuit the resistor 101 and capacitor 100 may be included to provide a time delay circuit to permit the voltage of the circuit to reach a sufficient value to continue to operate the relay 42 before the SCR1 begins to conduct. When a quicker responding device, such as a transistor or other electronic switching device, is provided in place of the relay 42, the capacitor 100 may be eliminated and still achieve satisfactory results, as desired.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:
1. A data-sensing device for sensing indicia carried by an indicia member in the form of areas having a dielectric strength lower than the dielectric strength of the material of said indicia member comprising:
an indicia-sensing means including a plurality of pairs of spaced, generally oppositely disposed terminal members adapted to receive said indicia member therebetween,
power means electrically associated with said indicia-sensing means;
signal control means electrically associated with said power means for causing electrical energy to be transmitted between said opposed pairs of terminal members when an area of low dielectric strength is exposed therebetween;
said signal control means including a pulse generator device common to all of said pairs of terminal members to substantially simultaneously supply electrical energy thereto; and an energy-distributing means electrically associated with each pair of said terminal members to enable electrical energy to be transmitted between a plurality of said pairs in said simultaneous relation upon a single pulse from said pulse generator device.

2. A data sensing device in accordance with claim 1, wherein said signal control means includes switching means electrically associated with said power means for selectively controlling the transmission of electrical energy from said signal control means.

3. A data-sensing device in accordance with claim 1, including a pair of oppositely disposed support members mounting said terminal members, said support members being spaced apart a sufficient distance to receive said indicia member therebetween.

4. A data-sensing device in accordance with claim 3, wherein said support members are made from a nonconductive material.

5. A data-sensing device in accordance with claim 1, wherein said signal control means includes a first switching device electrically connected to said power means, and energy storage means electrically connected to said first switching device and adapted to discharge electrical energy when said first switching device is in the closed condition.

6. A data-sensing device in accordance with claim 5, wherein said signal control means includes a second switching device electrically connected to said energy storage means and to said power means adapted to transmit electrical energy to said energy storage means.

7. A data-sensing device in accordance with claim 6, wherein said second switching device is electrically connected to said power means and to said first switching device and adapted to close said first switching device to permit transmission of electrical energy from said energy storage means to said indicia-sensing means.

8. A data-sensing device in accordance with claim 6, including a third switching device electrically connected to said first switching device and to said second switching device for transmitting electrical energy to said first switching device from said second switching device when said third switching device is in a closed condition.

9. A data-sensing device in accordance with claim 1, including: indicating means electrically associated with said indicia-sensing means and adapted to indicate the transmission of electrical energy transmitted in the form a spark between any one of said pairs of terminal members.

10. A data-sensing device in accordance with claim 1, including: indicating means having switching means electrically connected to said indicia-sensing means and said switching means being in the closed condition when said electrical energy is transmitted between a respective one of said pairs of terminal members.

11. A data-sensing device in accordance with claim 10, wherein: said switching means comprises a silicon control rectifier and the gate of said silicon control rectifier is electrically connected in series to said respective one of said pairs of terminal members.

12. A data-sensing device in accordance with claim 1, wherein: said energy-distributing means comprises a resistance means connected in series with each of said pairs of terminal members.

13. A data-sensing device in accordance with claim 11, wherein: said resistance means has a high ohmic value to reduce the parallel loading between adjacent of said opposed pairs of terminal members, eliminate generation of radio frequencies, and ensure substantially simultaneous transfer of electrical energy between said opposed pairs of terminal members when an area of low dielectric strength is disposed therebetween.

14. A data-sensing device in accordance with claim 1, wherein:
indicating means is provided for each pair of opposed terminal members; and each of said indicating means includes switching means electrically connected to a respective one of said pairs of opposed terminal members and being in the closed condition when the electrical energy in the form of a spark is transmitted between the respective ones of said opposed terminal members.

15. A data-sensing device in accordance with claim 11, wherein: said resistance means is connected in series between said indicating means and each of said pairs of terminal members.

16. A device in accordance with claim 1, wherein:
said signal control means includes transformer means electrically connected to said indicia-sensing means,
energy storage means electrically connected to said power means adapted to be charged thereby;
a first switching device electrically connected between said transformer means and said energy storage means; and
said energy storage means electrically connected to said transformer means to enable said energy storage means to discharge directly into said transformer means when said first switching device is in the closed condition and to provide all of the energy for said single pulse.

17. A data-sensing device in accordance with claim 15, wherein: said transformer means comprises a transformer having a low impedance core to provide an extremely fast rate of change of voltage.

18. A device in accordance with claim 5, wherein: said first switching device comprises a silicon control rectifier, and the gate of said silicon control rectifier is electrically connected to said power means to provide gate current for said silicon control rectifier.

19. A method for sensing indicia carried by an indicia member in the form of areas having a dielectric strength lower than the dielectric strength of the material of said indicia member, and wherein the indicia member is adapted to be presented between a plurality of pairs of spaced, generally oppositely disposed terminal members carried by an indicia-sensing means having one common pulse generator for all of said terminal members comprising:
providing a source of electrical energy;
controlling the transfer of said electrical energy to said indicia-sensing means;
presenting said indicia member between said terminal members of said indicia-sensing means so that any of said areas carried thereon are generally aligned between opposed of said pairs of terminal members;
providing a single pulse of electrical energy selectively by said one common pulse generator;
transmitting said single pulse from said one common pulse generator to all of said terminal members simultaneously;
substantially simultaneously transmitting said energy in the form of a spark between any of said pairs of said terminal members having any of said areas generally aligned therebetween.

20. A method in accordance with claim 19, wherein: the step of controlling the transfer of electrical energy includes the further step of storing a limited quantity of said electrical energy.

21. A method in accordance with claim 19, wherein: said step of selectively providing a pulse of electrical energy includes the further step of using said limited quantity of stored energy for said pulse.

22. A method in accordance with claim 21, including: the step of applying said pulse directly to the primary terminals of a transformer having a low impedance and high input/output ratio.

23. A method in accordance with claim 19, providing: an energy-distributing means and transmitting said electrical energy transmitted between any of said opposed pairs of terminal members through said energy distributing means.

24. A method in accordance with claim 19, providing: an indicating means and transmitting said electrical energy between none, any one or all of said pair of terminal members in the form of a pulse to said indicating means to indicate the occurrence of a transfer of electrical energy between none, any one or all of said pairs of terminal members.